United States Patent [19]

Fields

[11] Patent Number: 4,789,196
[45] Date of Patent: Dec. 6, 1988

[54] CONVERTIBLE TOP FOR PICK-UP TRUCKS
[75] Inventor: Delmer G. Fields, Waterford, Mich.
[73] Assignee: Transmatic, Incorporated, Waterford, Mich.
[21] Appl. No.: 902,761
[22] Filed: Sep. 2, 1986
[51] Int. Cl.$^4$ ............................................... B60P 7/02
[52] U.S. Cl. ..................................... 296/100; 296/105
[58] Field of Search ..................... 296/100, 56, 105; 384/42

[56] References Cited

U.S. PATENT DOCUMENTS

| | | | |
|---|---|---|---|
| 2,853,340 | 9/1958 | Hershberger | 296/100 X |
| 3,165,352 | 1/1965 | Hallock et al. | 296/100 |
| 3,231,305 | 1/1966 | Beckman | 296/100 |
| 3,688,787 | 9/1972 | Feather | 296/100 |
| 4,252,363 | 2/1981 | Rodrigue | 296/224 |
| 4,639,034 | 1/1987 | Amos | 296/100 |

FOREIGN PATENT DOCUMENTS 2128563 5/1984 United Kingdom ................ 296/100

OTHER PUBLICATIONS

J. C. Whitney Catalog #470j, p. 1, May 1986, Pedder.

Primary Examiner—Robert B. Reeves
Assistant Examiner—Russell D. Stormer
Attorney, Agent, or Firm—Reising, Ethington, Barnard, Perry & Milton

[57] ABSTRACT

A convertible top for pick-up trucks is disclosed having front and rear shells with a collapsible canopy therebetween and the rear shell being movable on side rails from a retracted to an extended position of the top. In the closed position, the rear shell is telescoped into the front shell and the canopy, including plural bows and a flexible sheet, are stowed inside the capsule formed by the shells. The rear shell is supported on the rails by a pair of carriages and the bows are individually carried at opposite ends by a pair of bow carriers. A latch is mounted on a swivel on each carriage and coacts with a front latch keeper on the rail in the retracted position and a different latch keeper on the rail in the extended position. A storage cabinet is disposed beneath the front shell and supported on the truck bed and is accessible through the cab window and a front window in the front shell and also through a rear window in the rear shell. A brake lamp is mounted on the rear shell and adapted to be plugged in to the brake lamp circuit of the vehicle for use when the convertible top is either retracted or extended.

10 Claims, 4 Drawing Sheets

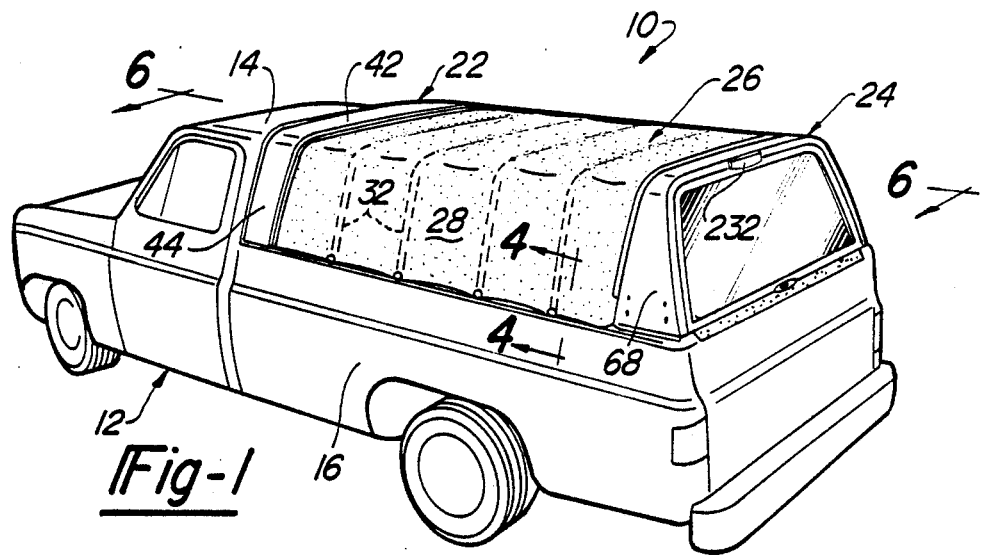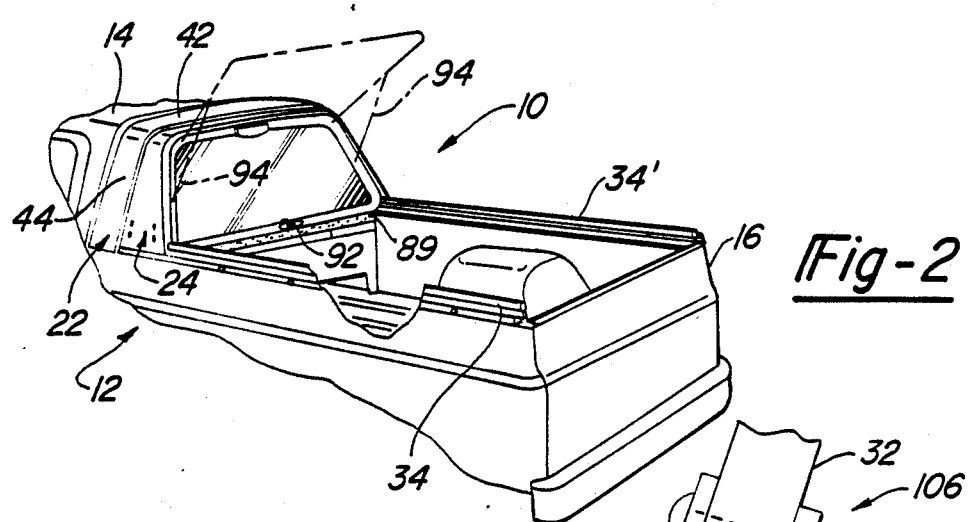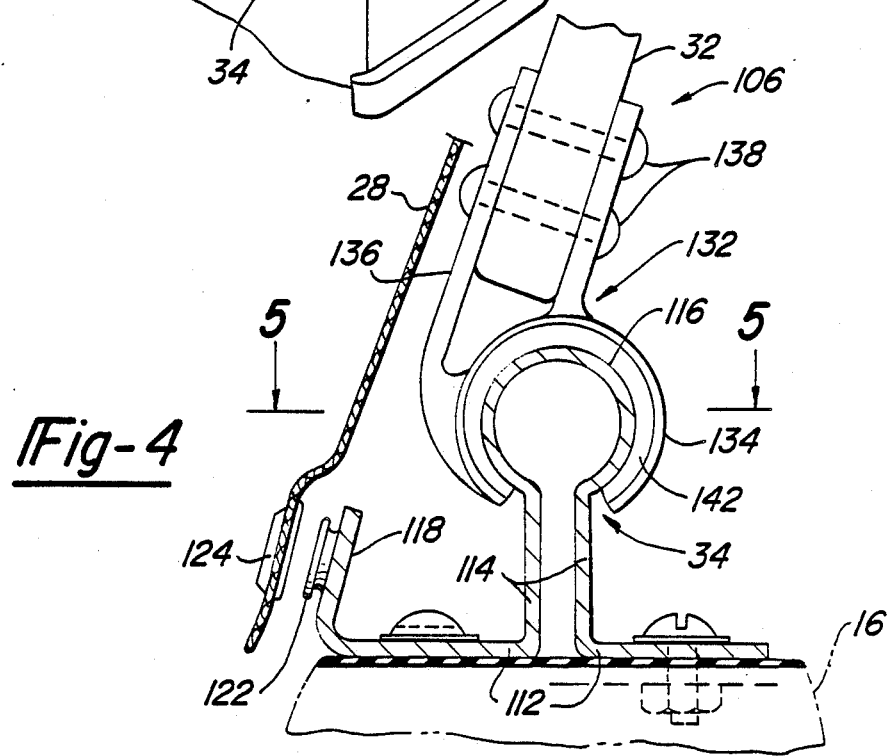

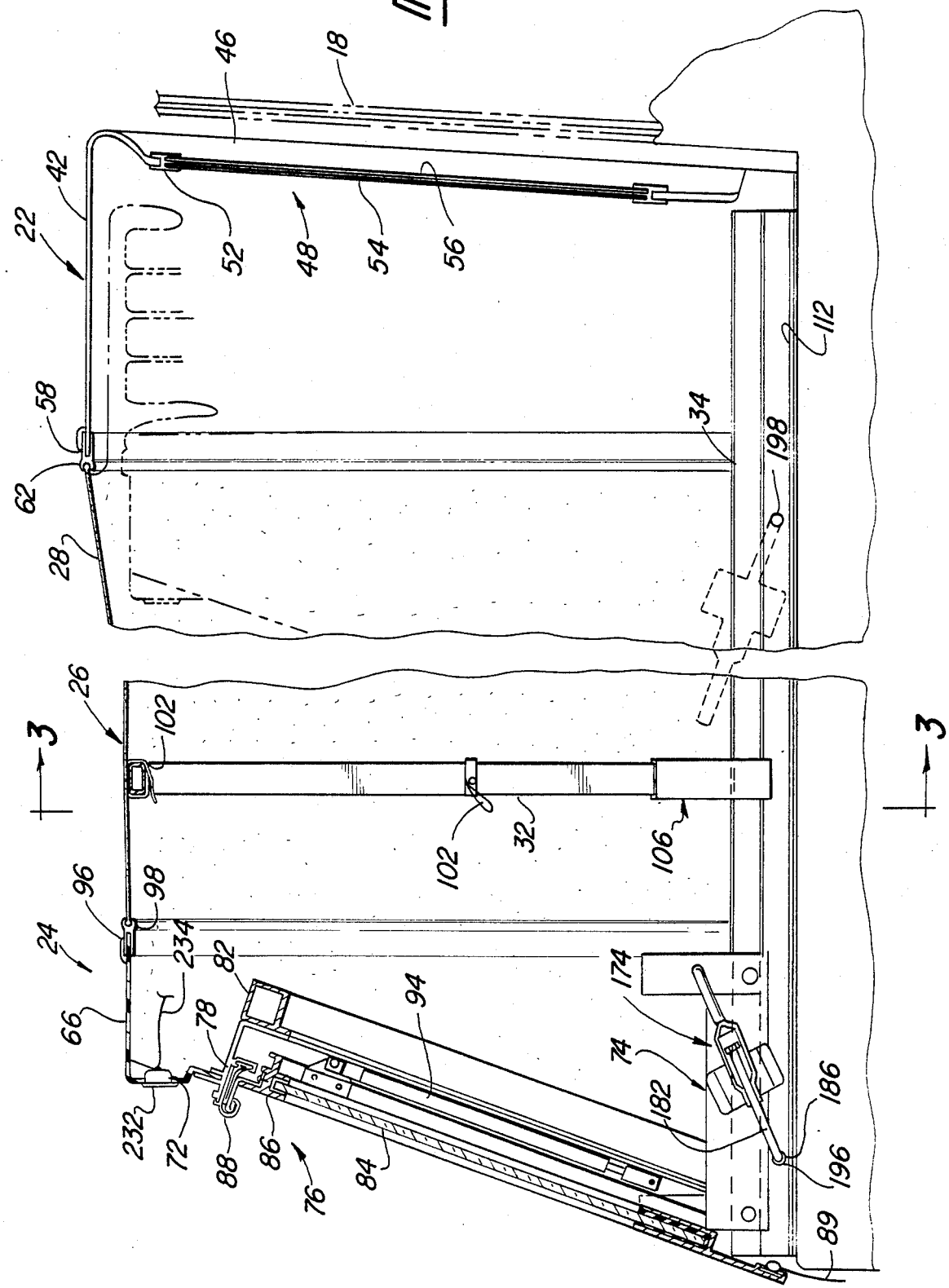

CONVERTIBLE TOP FOR PICK-UP TRUCKS

FIELD OF THE INVENTION

This invention relates to canopies for truck beds; more particularly, it relates to a convertible top for pick-up trucks and the like.

BACKGROUND OF THE INVENTION

To increase the versatility of use of a pick-up truck, it is a common practice to utilize a canopy over the open cargo box or bed of the truck. One form of canopy is a rigid cover or cap which is removably mounted on the cargo box to provide a complete enclosure with a suitable door and windows for use as sleeping quarters and the like. Another known form of pick-up truck canopy is a collapsible enclosure mounted on the cargo box and adapted to be retracted in accordion fashion to leave most of the box uncovered or open and adapted to be extended to a closed position in which the box is covered. This type of canopy is referred to as a "convertible top" inasmuch as it may remain on the truck and be converted between an open top and a closed top for the cargo box.

In the prior art, the Feather U.S. Pat. No. 3,688,787 granted Sept. 5, 1972, discloses a longitudinally collapsible canopy for pick-up trucks. The canopy of this patent comprises a plurality of transversely extending bows which are movably mounted at opposite ends on respective tracks which are fixed to the sides of the truck box; a flexible sheet is supported by the bows and is adapted to cover and enclose the truck box when the bows are spaced apart and to fold into festoons between the bows when the canopy is collapsed with the bows closely adjacent each other. A front panel is affixed to the truck box at the forward end thereof and extends somewhat higher than the cab roof with a window in alignment with the window in the truck cab. A rear panel is attached to the rearward bow and moves therewith between the open and closed position of the canopy. A window is also provided in the rear panel. When the convertible top of the Feather patent is open, i.e. the canopy collapsed, the flexible sheet of the top is folded over the bows and is exposed to the weather. Further, the top, especially in the open position, is an unattractive addition to the vehicle.

The Rodrigue U.S. Pat. No. 4,252,363 granted Feb. 24, 1981, discloses a convertible top for a pick-up truck with a rigid capsule for enclosing a collapsible canopy when the covertible top is open. The convertible top of Rodrigue comprises a rigid front shell fixedly mounted on the front end of the truck box and a rigid rear shell which is movably mounted on tracks fixed to the sides of the truck box. A set of bows are disposed between the front and rear shells and are movably mounted on the tracks and support a flexible sheet which is attached at one end to the forward end of the front shell and at the rear end to the inside of the rear shell. When the convertible top of Rodrigue is open, the front and rear shells completely enclose the bows and the sheet of the canopy. The rear shell is movable to the rear end of the truck box to a closed or extended position in which the convertible top covers the truck box. The front shell is provided with a transparent window and the rear shell is provided with a window and a suitable closure. The convertible top of the Rodrigue patent utilizes an abutting relationship between the front and rear shells in which the flexible sheet extends from the front of the front shell to the rear shell. This arrangement is not entirely satisfactory from the standpoint of space utilization.

A general object of this invention is to provide an improved convertible top for pick-ups which overcomes certain disadvantages of the prior art.

SUMMARY OF THE INVENTION

In accordance with this invention, a convertible top for pick-ups is provided which utilizes rigid front and rear shells with a flexible canopy therebetween and which form a closed capsule with improved space utilization when the convertible top is retracted. This is accomplished by attachment of the flexible canopy to the edges of the shells and a telescopic relation between the two shells.

Further, according to the invention, the convertible top comprises rigid front and rear shells mounted on the cargo box of the pick-up truck with a pair of rails mounted on opposite sides of the box and extending from the rear end of the box into the front shell. A collapsible canopy, including a sheet supported on a plurality of arch-like bows, has the front edge of the sheet secured to the rear end of the front shell and the rear edge secured to the front end of the rear shell. The rear shell is movable by carriages on the rails between an open position adjacent the rear end of the box to a closed position in which the shells overlap each other in a telescopic arrangement to form a closed capsule. Each bow is movably supported at each end on said rails by a bow carrier and when the shells are closed, the canopy is collapsed with the sheet folded into festoons inside of the closed capsule. Preferably, the rear shell is partially disposed inside the front shell in the telescopic arrangement.

Further, in accordance with the invention, the front shell includes a front window and is provided with a slideable closure whereby the inside of the closed capsule is accessable from the truck cab through the cab window. Further, the rear shell is provided with a hinged window. Further, the capsule is adapted to accommodate a storage cabinet or shelf arrangement.

Further, according to this invention, a convertible top for pick-ups having a rigid rear shell is provided with an electric brake lamp mounted thereon and adapted for use when the canopy is either retracted or extended.

Further, in accordance with the invention, an improved rail structure is provided for supporting the carriage on each side of the rear shell and for supporting the bow carrier on each end of the bows of the canopy. The rail comprises a base member adapted to be secured to the upper surface of the side panel of the cargo box, a web section extending perpendicularly from the base member and a cylindrical track supported on the web section. Further, one side of the base member terminates in an up-turned edge with plural fastener elements mounted on the edge for coacting with faster elements on the sheet of the canopy. Preferably, the rail is constructed as an extrusion in which the track and the web section are hollow.

Further, in accordance with the invention, a convertible top for pick-ups is provided with a retractable latch element pivotally mounted on the carriage of the rear shell and a latch keeper is disposed at the rear end of the rail and at the front end of the rail for coaction with the latch element for latching the shell in either the retracted or extended position of the canopy.

A complete understanding of this invention may be obtained from the detailed description that follows taken with the accompanying drawings.

DESCRIPTION OF THE DRAWINGS

FIG. 1 is a perspective view of the convertible top of this invention in the extended position;

FIG. 2 is a perspective view of the convertible top in the retracted position;

FIG. 4 shows the construction of a rail and a bow carrier of the canopy;

FIG. 7 is a longitudinal section of the convertible top in the extended position (solid lines) and in the retracted position (broken lines)

BEST MODE FOR CARRYING OUT THE INVENTION

Figure 3:
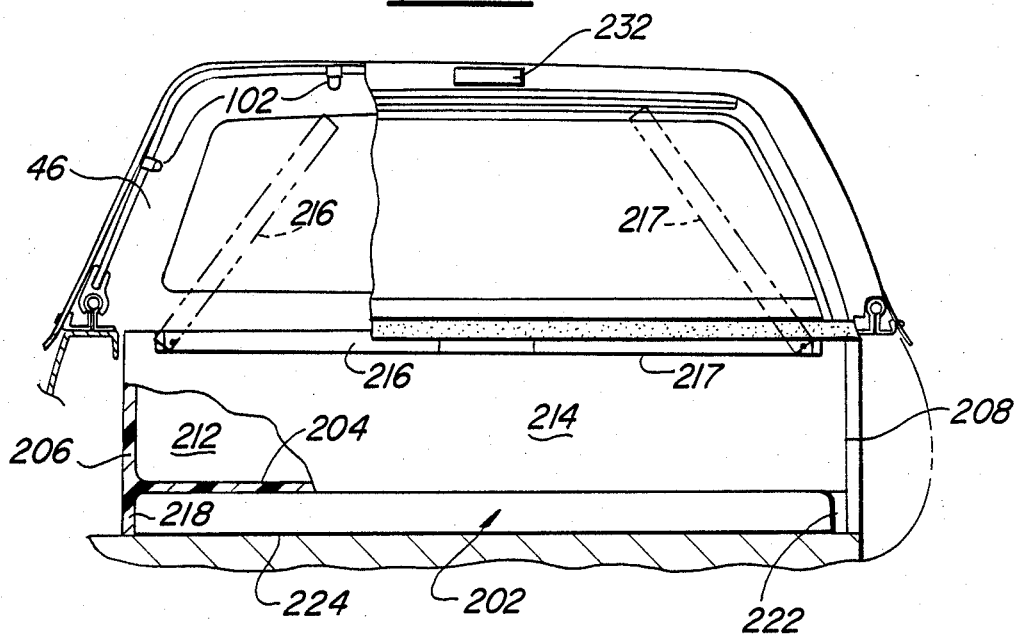
FIG. 3 is a view, with parts broken away, taken on lines 3—3 of FIG. 7.

Referring now to the drawings, there is shown an illustrative embodiment of this invention in a convertible top for pick-up trucks. It will be appreciated as the description proceeds that this invention is useful in other applications and may be realized in different embodiments.

As shown in the drawings, the convertible top 10 of this invention is installed on a pick-up truck 12 having a cab 14 and a cargo box 16. The cab 14 is provided with a rear window with a pair of laterally slideable glass panels. The truck box 16 includes a front panel, side panels and tailgate.

The convertible top, as shown in FIG. 1, is in the extended position, i.e. the top is closed and encloses the entire truck box. It is shown in the retracted or top-open position in FIG. 2 in which most of the truck box is open and the front portion of the box is enclosed by the top. The convertible top 10 comprises, in general, a fixed, rigid front shell 22, a movable rigid rear shell 24 and a collapsible canopy 26 therebetween. The canopy 26 comprises a flexible sheet 28 which is secured at its front end to the front shell 22 and at its rear end to the rear shell 24. The canopy includes a plurality of arch-like bows 32 which support the flexible sheet 28. The rear shell 24 and the bows 32 are movably supported on rails 34 and 34' which are mounted respectively on the side panels of the truck box 16.

The front shell 22 is generally rectangular shaped and comprises a top 42, a pair of oppositely disposed side walls 44 and a front wall 46. The front shell 22 is of unitary construction, suitably made of a molded phenolic or a fiberglass laminate. The front shell includes window 48 with a window frame 52. The window frame includes a pair of side-by-side slots which, respectively, carry a pair of closure glass panels 54 and 56 which extend only partially across the window 48 and are slideably relative to each other so that the window may be open or closed. The rear edge of the front shell 22 is provided with an edge molding or retaining strip 58 which is coextensive with the top 42 and the side walls 44. The rear edge of the retaining strip 58 terminates in a rearwardly opening elongated slot of circular cross-section. The circular slot is adapted to receive the front beaded edge 62 of the sheet 28, as will be described subsequently. The front shell 22 is fixedly mounted at the front end of the box 16 on the upper surface of the front and side panels. The front wall 46 of the front shell is spaced from the cab 14 by a small distance and the front window 48 is disposed opposite the cab window 18. Accordingly, opening of both the front window and cab window provides access from the cab to the interior of the front shell.

Figure 6:
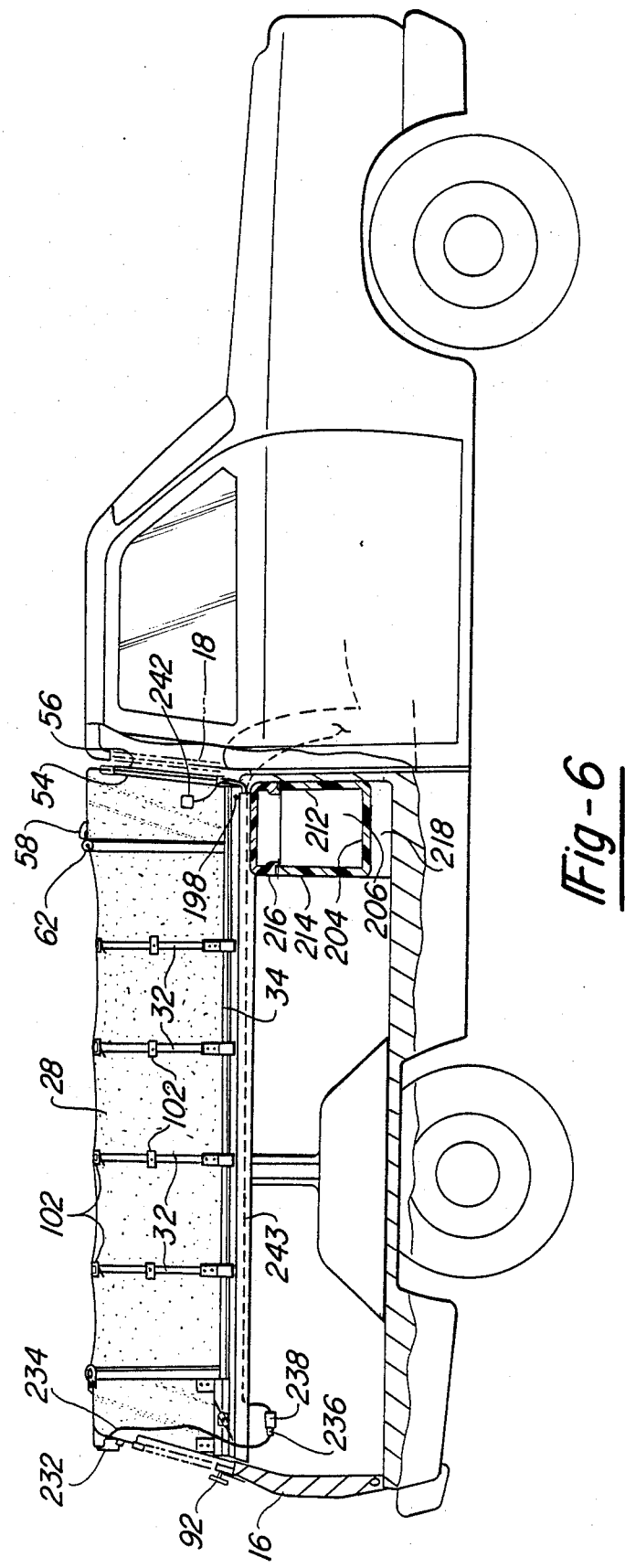
FIG. 6 is a side elevation view with parts broken away of the convertible top in the extended position.

The rear shell 24 is generally of rectangular configuration and comprises a top 66, a pair of oppositely disposed side walls 68 (only the left side wall is shown) and a rear wall 72. The shell 24 is of unitary construction and, like the front shell, is suitably made of a molded phenolic or laminated fiberglass. The rear shell 24 is movably supported on the rails 34 and 34' by a pair of oppositely disposed carriages 74 and 74' which are of identical construction (only carriage 74 is shown). The construction of carriage 74 will be described subsequently. The rear shell 24 includes a rear window 76 which comprises a window frome 78 in the rear wall 72. A reinforcing frame 82 of rectangular tubular construction is secured to the window frame 78. The window 76 is provided with a glass closure panel 84 mounted in a sash 86 which is mounted by a hinge 88 which extends across the upper side of the window frame 78. The sash 86 is provided with a handle 92 which actuates a suitable latch for retaining the window in the closed position as shown in FIG. 6. A sealing strip 89 is disposed on the bottom edge of the sash 86. The window is opened by lifting the handle 92 to pivot the sash about the axis of hinge 88 and it is retained in the open position by a pair of oppositely disposed hold-opens 94 and 94' of the gas strut type. The rear shell 24 is provided at its forward edge with an edge molding or retainer strip 96 which is secured thereto and which is coextensive with the top 66 and side walls 68. The retainer strip 96 is provided at its forward edge with a forward opening slot of circular cross-section which is adapted to receive the beaded rear edge 98 of the sheet 28. It is noted that the rear shell 24 is somewhat lower and narrower than the front shell 22 so that the former can fit in telescopic relation with the latter.

The collapsible canopy 26, as alluded to above, extends between the front shell 22 and the rear shell 24 and comprises a flexible sheet 28 and a plurality of arch-like bows 32. The sheet 28 is suitably a synthetic sheet material such as that currently used in the convertible tops of passenger cars. As mentioned above, the front edge of the sheet 28 terminates in a beading 62, i.e. a band of enlarged circular cross-section. The beading is suitably unitary with the sheet or may be attached by adhesive or by sewing. The rear edge of the sheet similarly terminates in a beading 98. The front edge of the sheet 28 is attached to the front shell 22 by inserting the beading 62 into the slot in the retainer strip 58 starting at the bottom of one side wall 44 and pulling the beading through the slot to the bottom of the other side wall. Similarly, the rear edge of the sheet 28 is attached to the rear shell 24 by inserting the beading 98 into the slot of the retainer strip 96. The sheet 28 is provided on the inside with straps 102 to attach the sheet to the straps 32. Each side edge of the sheet 28 is provided with a plurality of spaced female snap fastener elements 124 which are adapted to coact with complementary male snap fastener elements attached to the rails 34 and 34'. Each of the arch-like bows 32 of the collapsible canopy 26 is supported at its opposite free ends on the respective rails 34 and 34' by a bow carrier 106 which will be described subsequently. Each of the bows 32 is of tubular construction and as mentioned above the sheet 28 is attached thereto by a plurality of bows 102.

The rails 34 and 34' are of identical construction. As best shown in FIGS. 2 and 4, the rails 34 and 34' are mounted on the upper edge of the side panels of the truck box. The rail 34 comprises a base 112 with a web section 114 extending perpendicularly from the base and terminating in a cylindrical track 116. The rail 34 is formed, preferably as an extrusion, with a hollow cylindrical track 116 and a hollow web 114. The base 112 is provided at one edge with an upturned flange 118 which is disposed on the outside edge of the side panel of the truck box 16. The base 112 is secured by threaded fasteners to the side panel of the box. The flange 118 is provided with a set of spaced male snap fastener elements 122 which coact with the complementary female element 124 affixed to the lower edge of the sheet 28.

Figure 5:
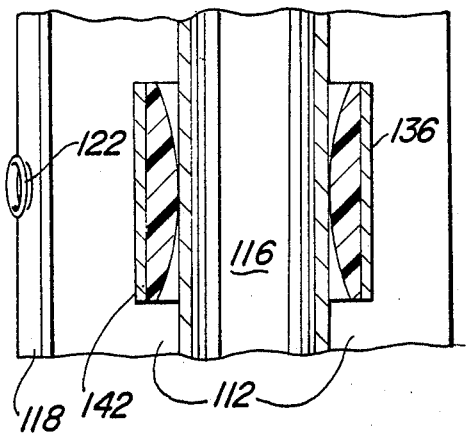
FIG. 5 is a view taken on lines 5—5 of FIG. 4.
Figure 8:
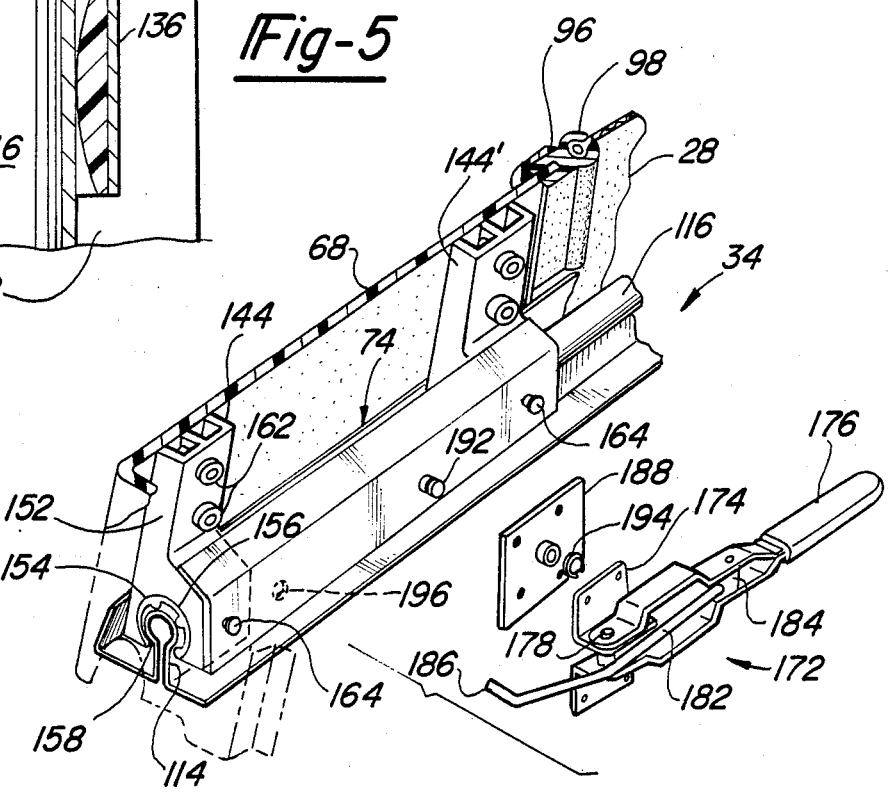
FIG. 8 is a perspective view of a carrier and latch for the rear shell.

Each of the bow carriers 106, as best shown in FIGS. 4 and 5, comprises a unitary bracket 132 having an open-sided sleeve 134 and having a unitary clevis 136 extending generally outwardly from the sleeve. The lower end of the bow 32 is received in the clevis 136 and secured by a pair of rivets 138. The sleeve 134 is provided with an open-sided antifriction tubular liner 142, suitably of nylon, having a constricted central portion with flared ends. The constricted central portion has a loose fit with the cylindrical track 116 so that it is slideable thereon.

As described above, the rear shell 24 is supported on each side for movement on the rails 34 and 34' by a carriage 74. As shown in FIGS. 6 and 7, the carriage 74 comprises a pair of slides 144 and 144' which are identical to each other and are connected by a plate 146. The slide 144 comprises a bracket 152 having an enlarged base with a cylindrical passage 154 which is open at the bottom side. A slide bearing 156, suitably of nylon, is disposed in the passage. The slide bearing 156 has a cylindrical outer surface and is open at the bottom to allow it to fit over the web section 114 of the track 34. The slide bearing 156 is provided on its inner surface with a set of three ribs 158 which are adapted to engage the track 116 of the rail 34. The bracket 152 has an upright section which is adapted to seat against the inner surface of the side wall of the rear shell 24 and is secured thereto by a pair of bolts which engage the respective nuts 162. The plate 146 is connected at opposite ends thereof to the respective slides 144 and 144' by fasteners 164.

Each of the carriages 74 is provided with a latch 172 for securing the rear shell 24 in either the rear position with the convertible top extended or in the front position with the convertible top retracted. The latch 172 is a pivotal latch of the over-center type and comprises a support bracket 174 and a handle 176 pivotally mounted on the bracket 174 by a pivot pin 178. the handle 176 carries a pull-rod 182 which is mounted on a pivot shaft 184 and terminates in a latch hook 186 at its free end. The pull-rod 182 is shaped so that the line of force exerted by the pull-rod moves over-center, i.e. crosses from one side of the axis of pivot pin 178 to the other when the handle 176 is actuated from its unlatched position to its latched position. The support bracket 174 is mounted by suitable fasteners on a swivel plate 188. The swivel plate 188 is mounted on a stud 192 extending from the connector plate 146 near the central portion thereof. The swivel plate 188 is secured to the stud 192 by a snap ring 194. As shown in FIG. 6, the latch hook 186 of the latch 172 is adapted to be inserted in a hole 196 in the web 114 of the rail 34 near the rear end thereof. The hole 196 serves as a latch keeper and when the latch is actuated to its latched position, the pull rod 182 is effective to draw the rear shell 24 toward the rear end of the rail 34 and to tighten the flexible sheet 28 of the convertible top. With the rear shell 24 in the retracted position, as shown in phantom lines in FIG. 6, the latch 174 is swiveled about the stud 192 and the hook 186 of the pull-rod 182 is inserted into the hole 198 in the web 114 of rail 34 and thus serves as a latch keeper. Actuation of the latch 174 to the latched position draws the rear shell 24 into the telescopic relation with the front shell 22.

A storage cabinet 202, as best shown in FIGS. 3 and 6, is disposed underneath the front shell 22 and is covered by the closed capsule formed by shells 22 and 24 when the convertible top is in the retracted position. The cabinet comprises a box-like structure and includes a bottom 204, a pair of end walls 206 and front and back panels 212 and 214, respectively. The cabinet is closed by hinged lids 216 and 217 which in the closed position form a shelf. The end walls 206 and 208 extend below the bottom 204 and the back panel 214 and constitute legs 218 and 222 which support the cabinet on the bed 224 of the truck box. The legs 218 and 222 provide a clearance space between the cabinet bottom 204 and the truck bed 224 to allow cargo, such as a 4'×8' sheet of plywood to lay on the truck bed and extend to the front of the box of the truck. With the convertible top in the retracted position, i.e. the capsule closed, the cabinet is inaccessible from the truck box. Further, it is secured by the closed capsule against access by those outside the truck and it is protected against the weather with the convertible top either retracted or extended. The hinged lid 216 allows access to the cabinet through the cab window 18 and the front window 48. Additionally, the lid 216 of the cabinet may be used as a storage shelf accessible to persons inside the cab.

A brake lamp 232, as shown in FIGS. 2 and 6, is mounted on the rear shell 24. The brake lamp 232 is adapted for operation from the electrical system of the pick-up truck and to be turned on or off by the brake switch. For this purpose, the brake lamp 232 is provided with an electrical power cord 234 which terminates in an electrical plug 236. A rear electrical receptacle 238 is mounted on one side panel of the truck box 16 near the tailgate and is adapted to receive the plug 236 when the convertible top is in the extended position. A front receptacle 242 is mounted on the side wall 44 of the truck box and is adapted to receive the plug 236 when the convertible top is in the retracted position. The receptacles 238 and 242 are electrically wired into the brake lamp circuit 243 of the pick-up truck so that the receptacles are energized when the brake switch is closed by operation of the truck brake. Thus, the brake lamp 232 is turned on and off by the brake switch in the same manner and concurrently with the conventional brake lamps on the rear of the truck. The brake lamp 232 is located in the rear wall 72 of the rear shell 24 in a centered position just below the top 66. In this position, the brake lamp 232 is clearly visible to vehicle drivers behind the pick-up truck when the convertible top is retracted and when it is extended, even with the rear window 76 in the open position.

The convertible top is moved from its retracted position to its extended position in the following manner. The latches 174 are released by reaching through the rear window 76 and the rear shell is moved back on the carrier 74 to the rear end of the truck box. The latches 174 are actuated to latch the rear shell in position. Finally, the flexible sheet 28 is fastened to the rails 34 and 34' by the snap fasteners. To return the convertible top to the retracted position, the reverse procedure is followed and the rear shell 24 is telescoped into the front shell 22 to form the closed capsule.

Although the description of this invention has been given with reference to a particular embodiment, it is not to be construed in the limiting sense. Many variations and modifications will now occur to those skilled in the art. For a definition of the invention reference is made to the appended claims.

What is claimed is:

1. A convertible top for covering a cargo box of a pick-up truck, said top comprising:
    a rigid front shell having a top, a pair of opposed side walls and a front wall, said top and side walls having free edges surrounding an opening in said shell, said front shell being adapted to be fixedly mounted on said box at the front thereof with said front wall at the forward end of said box,
    a pair of rails adapted to be fixedly mounted on opposite sides of said box and extending from the rear end of said box into said front shell,
    a rigid rear sheel having a top, a pair of opposed side walls and a rear wall, said top and side walls of said rigid rear shell having free edges surrounding an opening in said rear shell, said rear shell being movably mounted by carriages on said rails for movement between an extended position adjacent the rear end of said box to a retracted position, the free edges of one of said shells being adapted to fit inside the free edges of the other of said shells in said retracted position, whereby said shells overlap each other in a telescopic arrangement to form a closed capsule,
    a collapsible canopy including a flexible sheet having a front edge secured to the rear end of said front shell and having a rear edge secured to the front end of said rear shell,
    said canopy also including a plurality of arch-like bows for supporting said sheet, each bow being movably supported at each end on a bow carrier on one of said rails for movement longitudinally thereof when said rear shell is moved between said extended and retracted positions,
    whereby said canopy may be collapsed with said sheet folded into festoons inside a first of said shells and with said sheet folded back upon itself over said festoons when said rear shell is moved to said retracted position with said first shell overlapping the other in said telescopic arrangement.

2. The invention as defined in claim 1 wherein said rear shell is partially disposed inside said front shell in said telescopic arrangement.

3. The invention as defined in claim 1 wherein:
    said front wall of said front shell includes a front window comprising a pair of slideable closure panels whereby the inside of said closed capsule is accessable through said front window.

4. The invention as defined in claim 1 wherein:
    said rear wall of said rear shell includes a rear window comprising a hinged closure panel.

5. the invention as defined in claim 1 including:
    an electric brake lamp mounted on said rear wall of said rear shell,
    and a conductor having one end connected to said lamp and the other end connected with a plug whereby said plug may be plugged into a receptacle at the rear end of said box when said rear shell is in said extended position and may be plugged into a receptacle at the front end of said box when said shell is in said retracted position.

6. The invention as defined in claim 1 wherein:
    each of said rails comprises a base member adapted to be secured to the upper surface of the side of said box, a web section extending perpendicularly from said base member, and a cylindrical track supported on said web section, said cylindrical track being adapted to support said carriage of said rear shell and to support said bow carriers.

7. The invention as defined in claim 6 wherein said rail is an extrusion with said cylindrical track being tubular, said web section comprising a pair of spaced plates, and said base member comprising inner and outer flagnes extending, respectively, from said plates.

8. The invention as defined in claim 7 wherein said outer flange terminates in an up-turned edge, and plural fastener elements mounted on said edge and adapted to coact with respective complementary fastener elements on said sheet.

9. The invention as defined in claim 8 wherein:
    each of said rails comprises a longitudinally extending cylindrical track,
    and each of said carriages comprises support means secured to one side of said rear shell, and at least two longitudinally spaced slide bearings in said support means, each of said slide bearings including plural axially extending spaced apart ribs engaging said rail.

10. The invention as defined in claim 1 including:
    a retractable latch element pivotally mounted on each of said carriages, and a latch keeper disposed at the rear end of said track for coaction with said latch element to latch said rear shell in the open position and a second latch keeper disposed at the forward end of said track for coaction with said latch element for latching said rear shell in the closed position.

* * * * *

UNITED STATES PATENT AND TRADEMARK OFFICE
CERTIFICATE OF CORRECTION

PATENT NO. : 4,789,196

DATED : December 6, 1988

INVENTOR(S) : Delmer G. Fields

It is certified that error appears in the above-identified patent and that said Letters Patent is hereby corrected as shown below:

Column 4, line 22, delete "frome" and insert -- frame --.

Column 5, line 58, delete "the" and insert -- The --.

Column 7, line 31, delete "sheel" and insert -- shell --.

Column 8, line 12, delete "the" and insert -- The --.

Signed and Sealed this

Tenth Day of April, 1990

Attest:

HARRY F. MANBECK, JR.

*Attesting Officer*  *Commissioner of Patents and Trademarks*